(12) United States Patent
Iyer et al.

(10) Patent No.: US 8,679,636 B2
(45) Date of Patent: Mar. 25, 2014

(54) FLUORINATED COMPOSITION COMPRISING PHOSPHORUS-CONTAINING ACID GROUP AND ALKOXY SILANE GROUP

(75) Inventors: Suresh Iyer, Woodbury, MN (US); David A. Hesselroth, Hudson, WI (US); Richard M. Flynn, Mahtomedi, MN (US); Karl J. Manske, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/825,138

(22) PCT Filed: Oct. 20, 2011

(86) PCT No.: PCT/US2011/056988
§ 371 (c)(1),
(2), (4) Date: Mar. 20, 2013

(87) PCT Pub. No.: WO2012/061021
PCT Pub. Date: May 10, 2012

(65) Prior Publication Data
US 2013/0216837 A1 Aug. 22, 2013

Related U.S. Application Data

(60) Provisional application No. 61/410,280, filed on Nov. 4, 2010.

(51) Int. Cl.
| | | |
|---|---|---|
| *B32B 15/04* | (2006.01) | |
| *B32B 15/08* | (2006.01) | |
| *B32B 15/082* | (2006.01) | |
| *B32B 27/28* | (2006.01) | |
| *B32B 27/30* | (2006.01) | |
| *C08F 214/18* | (2006.01) | |
| *C08F 230/02* | (2006.01) | |
| *C08F 230/08* | (2006.01) | |
| *C08F 228/02* | (2006.01) | |
| *C08F 228/04* | (2006.01) | |
| *C08F 14/18* | (2006.01) | |
| *C08F 30/02* | (2006.01) | |
| *C08F 30/08* | (2006.01) | |
| *C08F 28/02* | (2006.01) | |
| *C08F 28/04* | (2006.01) | |

(52) U.S. Cl.
USPC ........... 428/463; 428/457; 428/461; 428/500; 428/522; 526/242; 526/245; 526/247; 526/274; 526/277; 526/278; 526/279; 526/286; 526/289; 526/291; 526/292.1; 526/292.3; 526/292.6; 526/292.9; 526/294

(58) Field of Classification Search
None
See application file for complete search history.

(56) References Cited

U.S. PATENT DOCUMENTS

| | | | |
|---|---|---|---|
| 2,732,398 A | 1/1956 | Brice | |
| 2,803,615 A | 8/1957 | Ahlbrecht | |
| 3,250,808 A | 5/1966 | Moore, Jr. | |
| 4,147,685 A * | 4/1979 | Smith, Jr. | 524/284 |
| 5,468,784 A * | 11/1995 | Yanagawa et al. | 522/31 |
| 5,851,674 A | 12/1998 | Pellerite | |
| 5,883,147 A * | 3/1999 | Masuhara et al. | 522/42 |
| 6,376,065 B1 | 4/2002 | Korba | |
| 6,566,439 B2 * | 5/2003 | Samukawa | 524/533 |
| 6,664,354 B2 | 12/2003 | Savu | |
| 6,995,222 B2 | 2/2006 | Buckanin | |
| 7,008,758 B2 * | 3/2006 | Park et al. | 430/325 |
| 7,041,749 B2 * | 5/2006 | Dammann et al. | 525/532 |
| 7,148,360 B2 | 12/2006 | Flynn | |
| 7,321,018 B2 | 1/2008 | Dams | |
| 7,592,405 B2 * | 9/2009 | Otaguro et al. | 526/242 |
| 7,678,426 B2 | 3/2010 | Flynn | |
| 7,955,696 B2 * | 6/2011 | Baikerikar et al. | 428/328 |
| 8,187,704 B2 * | 5/2012 | Wakizaka et al. | 428/323 |
| 8,299,139 B1 * | 10/2012 | Taranekar et al. | 522/114 |
| 2005/0048288 A1 | 3/2005 | Flynn | |
| 2005/0137355 A1 | 6/2005 | Buckanin | |
| 2008/0315459 A1 | 12/2008 | Zhang | |
| 2009/0162700 A1 * | 6/2009 | Kehren et al. | 428/814 |
| 2010/0183889 A1 | 7/2010 | Dams | |

FOREIGN PATENT DOCUMENTS

| | | | |
|---|---|---|---|
| EP | 0340753 | | 11/1989 |
| EP | 1311637 | | 5/2003 |
| FR | 2910475 | * | 6/2008 |
| JP | 2258885 | | 10/1990 |
| WO | WO 2009/002637 | | 12/2008 |

OTHER PUBLICATIONS

International Search Report PCT/US2011/056988 Feb. 14, 2012, 3 pages.

* cited by examiner

*Primary Examiner* — Vivian Chen
(74) *Attorney, Agent, or Firm* — Carolyn A. Fischer

(57) ABSTRACT

Presently described is a composition comprising at least one first divalent unit comprising a pendant perfluoropolyether or perfluoroalkyl group; at least one second divalent unit comprising a pendant phosphorus-containing acid group; and at least one third unit comprising a terminal or pendant alkoxy silane group. Also described is a coating comprising the composition described herein dissolved or dispersed in a solvent and a method of providing a coated article or surface. Such method is particularly useful for providing corrosion protection to a metallic surface.

34 Claims, No Drawings

FLUORINATED COMPOSITION COMPRISING PHOSPHORUS-CONTAINING ACID GROUP AND ALKOXY SILANE GROUP

BACKGROUND

U.S. Pat. No. 7,678,426 describes perfluoropolyether amide-linked phosphonates and derivatives thereof. Additionally, articles, method of making articles, and methods of reducing contaminant adhesion to a substrate are described.

U.S. Pat. No. 7,678,426 describes a composition comprising at least one first divalent unit represented by formula:

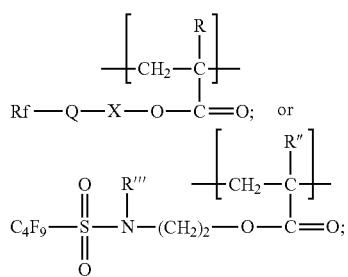

and
at least one of a second divalent unit comprising a pendant Z group or a monovalent unit comprising a thioether linkage and a terminal Z group, wherein each Z group is independently selected from the group consisting of —P(O)(OY)$_2$ and
—O—P(O)(OY)$_2$. Rf is a perfluoropolyether group. Q is selected from the group consisting of a bond, —C(O)—N (R$^1$)—, and —C(O)—O—. R", R'", R and R$^1$ are each independently selected from the group consisting of hydrogen and alkyl having from 1 to 4 carbon atoms. X is selected from the group consisting of alkylene, arylalkylene, and alkylarylene, wherein alkylene, arylalkylene, and alkylarylene are each optionally interrupted by at least one ether linkage. Y is selected from the group consisting of hydrogen, alkyl, trialkylsilyl, and a counter cation. Methods of treating a surface using these compositions and articles with a surface in contact with these compositions are provided. Methods of making these compositions are also provided.

SUMMARY

Although various compositions comprising a fluorinated group and a phosphorus-containing acid group have been described, industry would find advantage in new compounds that can provide improved corrosion protection to metal surfaces.

Presently described is a composition comprising at least one first divalent unit comprising a pendant perfluoropolyether or perfluoroalkyl group; at least one second divalent unit comprising a pendant phosphorus-containing acid group; and at least one third unit comprising a terminal or pendant alkoxy silane group.

Also described is a coating comprising the composition described herein dissolved or dispersed in a solvent. The solvent is preferably a non-aqueous organic solvent, such as a solvent comprising a hydrofluoroether.

Also described is a method of providing a coated article or surface. The method comprises applying the coating composition to an article or surface and volatilizing the solvent. Such method is particularly useful for providing corrosion protection to a metallic surface.

DETAILED DESCRIPTION

The terms "a", "an", and "the" are used interchangeably with "at least one".

"Alkyl group" and the prefix "alk-" are inclusive of both straight chain and branched chain groups and of cyclic groups having up to 30 carbons (in some embodiments, up to 25, 20, 15, 12, 10, 8, 7, 6, or 5 carbons) unless otherwise specified. Cyclic groups can be monocyclic or polycyclic and, in some embodiments, have from 3 to 10 ring carbon atoms.

"Alkylene" is the divalent form of the "alkyl" groups defined above.

"Arylalkylene" refers to an "alkylene" moiety to which an aryl group is attached.

The term "aryl" as used herein includes carbocyclic aromatic rings or ring systems, for example, having 1, 2, or 3 rings and optionally containing at least one heteroatom (e.g., O, S, or N) in the ring. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

"Arylene" is the divalent form of the "aryl" groups defined above.

"Alkylarylene" refers to an "arylene" moiety to which an alkyl group is attached.

Unless otherwise noted, "HFPO-" refers to the end group F(CF(CF$_3$)CF$_2$O)$_a$CF(CF$_3$)— such as found in the methyl ester F(CF(CF$_3$)CF$_2$O)$_a$CF(CF$_3$)C(O)OCH$_3$, wherein "a" averages 4 to 15. In some embodiments, "a" averages between 4 and 10 or "a" averages between 5 and 8. Such species generally exist as a distribution or mixture of oligomers with a range of values for "a", so that the average value of "a" may be non-integer. The molecular weight of the HFPO-perfluoropolyether material varies depending on the number ("a") of repeat units from about 750 g/mole to about 1800 g/mole, with 1100 g/mole to 1400 g/mole typically being preferred. In one embodiment, "a" averages 6.2. This methyl ester has an average molecular weight of about 1,200 g/mol, and can be prepared according to the method reported in U.S. Pat. No. 3,250,808 (Moore et al.), the disclosure of which is incorporated herein by reference, with purification by fractional distillation.

"Alkoxy Silane" refers to the group —Si(OR)$_3$, wherein R is independently hydrogen or an alkyl group having 1 to 4 carbon atoms.

All numerical ranges are inclusive of their endpoints unless otherwise stated.

Presently described are compositions comprising at least one first unit comprising a perfluoropolyether or perfluoroalkyl group, at least one second unit comprising a phosphorus-containing acid group, and at least one third unit comprising an alkoxysilane group.

The first units are typically divalent units comprising a pendant perfluoropolyether group, perfluoroalkyl group, or combination thereof.

In some embodiments, the compositions comprise at least one first divalent unit represented by formula:

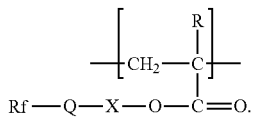

Rf is a perfluoropolyether group. The term "perfluoropolyether" refers to a compound or group having at least 10 or 11 and preferably 12 to 15 up to about 36 carbon atoms and at least 3 to 10 or 11 ether linkages, wherein the hydrogen atoms on the carbon atoms are replaced with fluorine atoms. In some embodiments, Rf has up to 100 carbon atoms and up to 30 ether linkages.

Compositions represented by Formula I may contain one perfluoropolyether group or a mixture of perfluoropolyether groups. Typically, the compositions will contain a mixture of perfluoropolyether groups.

In some embodiments, Rf is represented by formula $R_f^a$—O—$(R_f^b$—O—$)_z(R_f^c)$—, wherein $R_f^a$ is a perfluoroalkyl having 1 to 10 (in some embodiments, 1 to 6, 1 to 4, 2 to 4, or 3) carbon atoms; each $R_f^b$ is independently a perfluoroalkylene having 1 to 4 (i.e., 1, 2, 3, or 4) carbon atoms; $R_f^c$ is a perfluoroalkylene having 1 to 6 (in some embodiments, 1 to 4 or 2 to 4) carbon atoms; and z is an integer from 2 to 50 (in some embodiments, 2 to 25, 2 to 20, 3 to 20, 3 to 15, 5 to 15, 6 to 10, or 6 to 8).

Representative $R_f^a$ groups include $CF_3$—, $CF_3CF_2$—, $CF_3CF_2CF_2$—, $CF_3CF(CF_3)$—, $CF_3CF(CF_3)CF_2$—, $CF_3CF_2CF_2CF_2$—, $CF_3CF_2CF(CF_3)$—, $CF_3CF_2CF(CF_3)CF_2$—, and $CF_3CF(CF_3)CF_2CF_2$—. In some embodiments, $R_f^a$ is $CF_3CF_2CF_2$—. Representative $R_f^b$ groups include —$CF_2$—, —$CF(CF_3)$—, —$CF_2CF_2$—, —$CF(CF_3)CF_2$—, —$CF_2CF_2CF_2$—, —$CF(CF_3)CF_2$—, —$CF_2CF_2CF_2CF_2$—, and —$CF_2C(CF_3)_2$—. Representative $R_f^c$ groups include —$CF_2$—, —$CF(CF_3)$—, —$CF_2CF_2$—, —$CF_2CF_2CF_2$—, and $CF(CF_3)CF_2$—. In some embodiments, $R_f^c$ is —$CF(CF_3)$—.

In some embodiments, $(R_f^b$—O—$)_z$ is represented by —[$CF_2O$]$_i$[$CF_2CF_2O$]$_j$—, —[$CF_2O$]$_i$[$CF(CF_3)CF_2O$]$_j$—, [$CF_2O$]$_i$[$CF_2CF_2CF_2O$]$_j$—, —[$CF_2CF_2O$]$_i$[$CF_2O$]$_j$—, —[$CF_2CF_2O$]$_i$[$CF(CF_3)CF_2O$]$_j$—, —[$CF_2CF_2O$]$_i$[$CF_2CF_2CF_2O$]$_j$—, —[$CF_2CF_2CF_2O$]$_i$[$CF_2CF(CF_3)O$]$_j$—, and [$CF_2CF_2CF_2O$]$_i$[$CF(CF_3)CF_2O$]$_j$—, wherein i+j is an integer of at least 3 (in some embodiments, at least 4, 5, or 6).

In some embodiments, Rf is selected from the group consisting of $C_3F_7O(CF(CF_3)CF_2O)_nCF(CF_3)$—, $C_3F_7O(CF_2CF_2CF_2O)_nCF_2CF_2$—, and $CF_3O(C_2F_4O)_nCF_2$—, and wherein n has an average value in a range from 3 to 50 (in some embodiments, 3 to 25, 3 to 15, 3 to 10, 4 to 10, or even 4 to 7). In some of these embodiments, Rf is $C_3F_7O(CF(CF_3)CF_2O)_nCF(CF_3)$—, wherein n has an average value in a range from 4 to 7. In some embodiments, Rf is selected from the group consisting of $CF_3O(CF_2O)_x(C_2F_4O)_yCF_2$— and $F(CF_2)_3$—O—$(C_4F_8O)_z(CF_2)_3$—, wherein x, y, and z each independently has an average value in a range from 3 to 50 (in some embodiments, 3 to 25, 3 to 15, 3 to 10, or even 4 to 10).

In some embodiments, Rf has a number average molecular weight of at least 500 (in some embodiments at least 750 or even 1000) grams per mole. In some embodiments, Rf has a number average molecular weight of up to 6000 (in some embodiments, 5000 or even 4000) grams per mole. In some embodiments, Rf has a number average molecular weight in a range from 750 grams per mole to 5000 grams per mole.

In divalent units of Formula I, Q is a bond (i.e. no linking atoms or group between Rf and X) or a divalent linking group such as —C(O)—N($R^1$)—, and —C(O)—O—, wherein $R^1$ is hydrogen or alkyl of 1 to 4 carbon atoms (e.g., methyl, ethyl, n-propyl, isopropyl, n-butyl, isobutyl, or sec-butyl). In some embodiments, Q is —C(O)—N($R^1$)—. In some embodiments, $R^1$ is hydrogen or methyl. In some embodiments, $R^1$ is hydrogen. For embodiments of compositions disclosed herein wherein Q is —C(O)—N($R^1$)—, the compositions may be more hydrolytically stable than embodiments wherein Q is —C(O)—O—.

R is hydrogen or alkyl of 1 to 4 carbon atoms (e.g., methyl, ethyl, n-propyl, isopropyl, n-butyl, isobutyl, or sec-butyl). In some embodiments, R is hydrogen or methyl.

X is selected from the group consisting of alkylene, arylalkylene, and alkylarylene, wherein alkylene, arylalkylene, and alkylarylene are each optionally interrupted by at least one heteroatoms such as an oxygen atom of an ether linkage. In some embodiments, X is alkylene. In some embodiments, X is ethylene. In some embodiments, X is methylene.

In compositions according to the present invention, when more than one first divalent unit of Formula I is present, each Rf, Q, R, $R^1$, and X group is independently selected.

In some embodiments, the first divalent unit of Formula I is represented by formula:

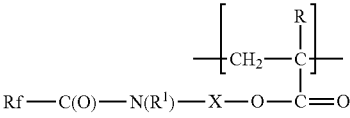

wherein Rf, R, $R^1$, and X are as defined above.

In a favored embodiment Rf is $C_3F_7O(CF(CF_3)CF_2O)_nCF(CF_3)$— wherein n is at least 3 or 4 and no greater than 10, X is ethylene and $R^1$ is H.

The first units are typically derived from a free-radically polymerizable compound comprising a terminal perfluoropolyether or perfluoroalkyl group.

In some embodiments, the first component is represented by the formula:

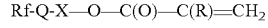

Rf-Q-X—O—C(O)—C(R)=$CH_2$ wherein Rf, Q, R, and X are as defined above for a divalent unit of Formula I. In some embodiments, the compound of is Rf—C(O)—N($R^1$)—X—O—C(O)—C(R)=$CH_2$, wherein $R^1$ is as defined above for a compound of Formula 1.

Alternatively, but more typically in combination with a (e.g. divalent) unit comprising a pendant perfluoroalkyl group as just described, the composition may comprise at least one divalent unit comprising a terminal perfluoroalkyl group.

In some embodiments, the composition comprises at least one first divalent unit represented by the formula:

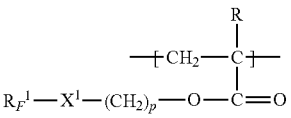

wherein $R_F^1$ is a perfluoroalkyl group and $X^1$ is a bond or a divalent linking group, such as —$SO_2N(R)$—.

In one embodiment, the compositions (e.g. further) comprise at least one divalent unit represented by formula:

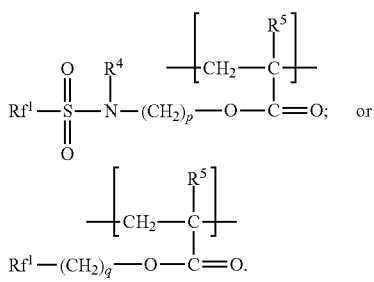

Each $Rf^1$ is independently a perfluoroalkyl group having from 3 to 12 (i.e., 3, 4, 5, 6, 7, 8, 9, 10, 11, or 12) carbon atoms. In some embodiments, each $Rf^1$ is independently a perfluoroalkyl group having from 3 to 6 (e.g., perfluoro-n-hexyl, perfluoro-n-pentyl, peffluoroisopentyl, perfluoro-n-butyl, perfluoroisobutyl, perfluoro-sec-butyl, perfluoro-tert-butyl, perfluoro-n-propyl, or perfluoroisopropyl). In some embodiments, $Rf^1$ is perfluorobutyl (e.g., perfluoro-n-butyl). In some embodiments, $Rf^1$ is perfluoropropyl (e.g., perfluoro-n-propyl). The term "perfluoroalkyl group" includes alkyl groups in which all C—H bonds are replaced by C—F bonds as well as groups in which one hydrogen is present replacing a terminal fluorine atom. In some embodiments of perfluoroalkyl groups, when at least one hydrogen is present, the perfluoroalkyl group includes at least one difluoromethyl group.

$R^4$ and $R^5$ are each independently hydrogen or alkyl having from 1 to 4 carbon atoms (e.g., methyl, ethyl, n-propyl, isopropyl, n-butyl, isobutyl, or sec-butyl). In some embodiments, $R^4$ is selected from the group consisting of methyl and ethyl. In some embodiments, $R^5$ is selected from the group consisting of hydrogen and methyl.

Each p is independently an integer having a value from 2 to 11 (i.e., 2, 3, 4, 5, 6, 7, 8, 9, 10, or 11).

Each q is independently an integer having a value from 1 to 4 (i.e., 1, 2, 3, 4, 5, 6, 7, 8, 9, 10, 11, 12, 13, 14, 15, 16, 17, 18, 19, or 20).

In a favored embodiment, the composition comprises at least one perfluoroalkyl unit having the formula:

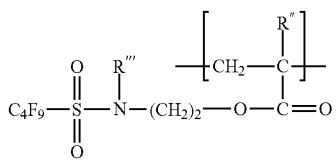

wherein R" and R''' are each independently hydrogen or alkyl having from 1 to 4 carbon atoms. In some embodiments, each R" is independently hydrogen or methyl. In some embodiments, R''' is methyl or ethyl.

Fluorinated free-radically polymerizable acrylate monomers comprising perfluoroalkyl groups, and methods for their preparation, are known in the art; (see, e.g., U.S. Pat. No. 2,803,615 (Albrecht et al.) and U.S. Pat. No. 6,664,354 (Savu et al.), the disclosures of which, relating to free-radically polymerizable monomers and methods of their preparation, are incorporated herein by reference). Methods described for making nonafluorobutanesulfonamido group-containing structures can be used to make heptafluoropropanesulfonamido groups by starting with heptafluoropropanesulfonyl fluoride, which can be made, for example, by the methods described in Examples 2 and 3 of U.S. Pat. No. 2,732,398 (Brice et al.), the disclosure of which is incorporated herein by reference. Methods for making other perfluoroalkyl compounds are known; (see, e.g., EP1311637 B1, published Apr. 5, 2006, and incorporated herein by reference for the disclosure of the preparation of 2,2,3,3,4,4,4-heptafluorobutyl 2-methylacrylate). Perfluoroalkyl compounds are also available from commercial sources (e.g., 3,3,4,4,5,5,6,6,6-nonafluorohexyl acrylate from Daikin Chemical Sales, Osaka, Japan and 3,3,4,4,5,5,6,6,6-nonafluorohexyl 2-methylacrylate from Indofine Chemical Co., Hillsborough, N.J.).

The compositions according to the present invention comprise at least one second unit comprising a phosphorus-containing acid group.

In some embodiments, the composition comprises a second divalent unit comprising a pendant, Z group, wherein Z is —P(O)(OY)$_2$ or Z is —O—P(O)(OY)$_2$. Each Y is independently hydrogen or an alkyl group having 1 to 4 carbon atoms.

In some embodiments, the second units may be represented by the formulas:

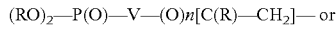

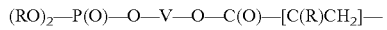

wherein each R is independently selected from the group consisting of hydrogen and alkyl having from 1 to 4 carbon atoms, and each V is independently alkylene that is optionally interrupted by at least one ether linkage or amine linkage, or arylene, and n=0 or 1. In some embodiments, V is alkylene having from 2 to 4 (in some embodiments, 2) carbon atoms. In some embodiments, R is selected from the group consisting of hydrogen and methyl. In some embodiments, the second unit may be styryl phosphonates, $(RO)_2P(O)PhCH=CH_2$; or alkyl phosphonates, $(RO)_2P(O)C_2H_4OCH=CH_2$.

The second units are typically derived from a free-radically polymerizable compound comprising a terminal phosphorus-containing acid group.

In some embodiments, the second units are derived from a component represented by the formula

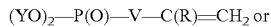

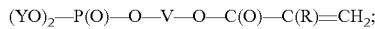

wherein R and V are as previously described. Some second components of these formulas are available, for example, from commercial sources (e.g. ethylene glycol methacrylate phosphate HEMA-P) or can be prepared using known synthetic methods. For improved compatibility with organic solvents such as hydrofluoroethers, the free-radically polymerizable group of the starting component that provides the pendent phosphorus-acid containing group is preferably a (meth)acrylate group, rather than a vinyl group.

In some embodiments, mixtures of more than one first component of Formula II and/or more than one second component of formula $(RO)_2$—P(O)—V—C(R)=CH$_2$ or $(RO)_2$—P(O)—O—V—O—C(O)—C(R)=CH$_2$ can be used. In other embodiments, one first component of Formula II and one second component of formula $(RO)_2$—P(O)—C(R)=CH$_2$ or $(RO)_2$—P(O)—O—V—O—C(O)—C(R)=CH$_2$ can be used.

The compositions according to the present invention comprise at least one third unit comprising a monovalent unit comprising a terminal alkoxy silane group, a divalent unit comprising a pendant alkoxy silane group, or a combination thereof.

In some embodiments, the third unit is a divalent unit represented by formula

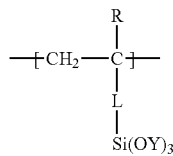

wherein
L is $CO_2(CH_2)_n$ with n=2 to 6 or phenyl; and
Y is independently an alkyl group having 1 to 4 carbon atoms.

In some embodiments, the third unit is a monovalent unit represented by formula

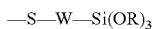

wherein W is a divalent or trivalent linking group selected from the group consisting of alkylene, arylalkylene, and arylene, wherein alkylene is optionally interrupted by at least one ether linkage, ester linkage, or amide linkage; and R is H or an alkyl group having 1 to 4 carbon atoms. Typically, W is an alkylene group having 1 to 4 carbon atoms.

Such monovalent unit —S—W—Si(OR)$_3$ can provide alkoxy silane terminal groups concurrently with end-capping the polymerization.

In some embodiments, the first divalent unit(s), comprising the pendant perfluoropolyether or perfluoroalkyl group, ranges from 20 to 80 mole % of the composition. In some embodiments, the first divalent unit(s) are present in the composition at a molar concentration of at least 25 or 30 mole % and no greater than 65 or 60 mole %.

In some embodiments, the second divalent unit(s), comprising the pendant phosphorus-containing acid group, ranges from 15 to 50 mole % of the composition. In some embodiments, the second divalent unit(s) are present in the composition at a molar concentration of at least 15 or 20 mole % and no greater than 55 or 50 mole %.

In some embodiments, the third divalent unit(s), comprising the terminal or pendant alkoxy silane group, ranges from 5 to 50 mole % of the composition. In some embodiments, the third divalent unit(s) are present in the composition at a molar concentration of at least 5 or 10 mole % and no greater than 45 or 40 mole %.

In some embodiments, the compositions comprise only the requisite combination of first, second, and third units, as described herein. In other embodiments, the compositions may comprise other units that do not comprise a perfluoropolyether or perfluoroalkyl groups, a phosphorus-containing acid group, or a pendant alkoxy silane group. Such "other" units are generally optional and employed at low concentration as to not detract from the properties contributed by the requisite units. When present, such other units are typically present at no greater than 5 mole-% of the composition.

In some embodiments, the compositions described herein comprise at least one divalent unit represented by formula:

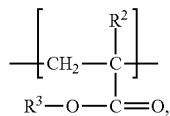

wherein each $R^2$ is independently selected from the group consisting of hydrogen and alkyl having from 1 to 4 carbon atoms (e.g., methyl, ethyl, n-propyl, isopropyl, n-butyl, isobutyl, or sec-butyl), and wherein each $R^3$ is independently alkyl having from 1 to 30 (in some embodiments, 1 to 25, 1 to 20, 1 to 10, 4 to 25, 8 to 25, or even 12 to 25) carbon atoms. In some embodiments, $R^2$ is selected from the group consisting of hydrogen and methyl. In some embodiments, $R^3$ is selected from the group consisting of hexadecyl and octadecyl.

In another embodiment, the compositions described herein comprise at least one divalent unit comprising alkylene oxide repeat units. Useful poly(alkylene oxide) (meth)acrylate monomers include but are not limited to, $CH_2$=CHC(O)—$(OC_2H_4)$n-OH, $CH_2$=CMeC(O)—$(OC_2H_4)$n-OH, $CH_2$=CHC(O)—$(OC_3H_6)$n-OH, $CH_2$=CMeC(O)—$(OC_3H_6)$n-OH, $CH_2$=CHC(O)—$(OC_4H_8)$n-OH, $CH_2$=CMeC(O)—$(OC_4H_8)$n-OH, and $CH_2$=CHC(O)—$NH(C_2H_4O)$n-$C_2H_4$NHMe, wherein n is at least 4.

Such units are generally derived from the addition of some other ethylenically unsaturated monomer such as a (meth)acrylate monomer. By "other" it is meant that such monomer lacks a perfluorinated group, a phosphorus-containing acid group, and an alkoxy silane group.

In some embodiments, the first, second and third divalent groups and any other divalent units present are randomly connected.

Compositions described herein may be prepared, for example, by reacting a mixture containing at least first, second, and third components typically in the presence of a chain transfer agent and an initiator. By the term "reacting" it is meant forming a composition that includes at least one identifiable structural element due to each of the first and second components. Depending on the stoichiometry of the reaction, an oligomer or polymer may be formed. Typically the polymer or oligomer has a distribution of molecular weights and compositions.

The reaction of at least one first fluorinated component, at least one second component comprising a phosphorus-containing acid group, and at least one component comprising an alkoxy silane group is typically carried out in the presence of an added free-radical initiator. Free radical initiators such as those widely known and used in the art may be used to initiate polymerization of the components. Exemplary free-radical initiators are described in U.S. Pat. No. 6,995,222 (Buckanin et al.), the disclosure of which is incorporated herein by reference.

Polymerization can be carried out at any temperature suitable for conducting an organic free-radical reaction. Temperature and solvent for a particular use can be selected by those skilled in the art based on considerations such as the solubility of reagents, temperature required for the use of a particular initiator, and desired molecular weight. While it is not practical to enumerate a particular temperature suitable for all initiators and all solvents, generally suitable temperatures are in a range from about 30° C. to about 200° C. (in some embodiments, from about 40° C. to about 100° C., or even from about 50° C. to about 80° C.).

Free-radical polymerizations may be carried out in the presence of chain transfer agents. Typical chain transfer agents that may be used in the preparation of compositions described herein include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); amino-substituted mercaptans (e.g., 2-mercaptoethylamine); difunctional mercaptans (e.g., di(2-mercaptoethyl)sulfide); and aliphatic mercaptans (e.g., octylmercaptan, dodecylmercaptan, and octadecylmercaptan).

In some embodiments, the chain-transfer agent is an aliphatic mercaptan, and the monovalent unit is represented by formula —S—C$_t$H$_{2t+1}$, wherein t is an integer from 4 to 22 (in some embodiments, 8 to 22 or even 12 to 22). In some embodiments, the chain-transfer agent is a hydroxyl-substituted mercaptan, and is represented by formula —S—W—[OH]$_m$, wherein W and m are as defined above.

Adjusting, for example, the concentration and activity of the initiator, the concentration of the requisite first, second and third components, the temperature, the concentration of the chain transfer agent, and the solvent using techniques known in the art can control the molecular weight of a polyacrylate copolymer.

Although non-aqueous solvents (or medium) for coating compositions can be favored for corrosion protection of metallic surfaces, for other uses the method of making a coating composition can comprise a medium including water. In these embodiments, typically a cosolvent is used. Suitable cosolvents include ethers (e.g., tetrahydrofuran, tert-butyl methyl ether), alcohols (e.g., ethanol and isopropanol), and ketones (e.g., methyl ethyl ketone and methyl isobutyl ketone). In some embodiments, the reaction is carried out in the presence of an anionic surfactant as an emulsifier (e.g., sodium dodecyl benzene sulfonate, sodium lauryl sulfate, sodium laureth sulfate, sodium dioctylsulfosuccinate, and reactive emulsifiers available, for example, from Uniqema under the trade designations "MAXEMUL 6106" and "MAXEMUL 6112".

In favored embodiments, the reaction is carried out in solvent. The components may be present in the reaction medium at any suitable concentration, (e.g., from about 5 percent to about 80 percent by weight based on the total weight of the reaction mixture). Illustrative examples of suitable solvents include ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone and methyl isobutyl ketone), halogenated solvents (e.g., methylchloroform, 1,1,2-trichloro-1,2,2-trifluoroethane, trichloroethylene, trifluorotoluene, and hydrofluoroethers available, for example, from 3M Company, St. Paul, Minn. under the trade designations "Novec™ 7100 Engineered Fluid" and "Novec™ 7200 Engineered Fluid", and mixtures thereof. Carrying out the reaction is a solvent is amenable to producing non-aqueous compositions having a water content less than 1%, or 0.5% or 0.1%.

In some embodiments, the surface is metallic (including metals and metal alloys). The metal is typically solid at room temperature. For some embodiments, the metal and/or metal alloy is selected from the group consisting of chromium, chromium alloys, iron, aluminum, copper, nickel, zinc, tin, (e.g. stainless) steel, and brass. Other metals include silver, titanium, indium, germanium, tin, nickel, indium tin.

Examples of articles having metal surfaces include kitchen and bathroom faucets, taps, handles, spouts, sinks, drains, hand rails, towel holders, curtain rods, dish washer panels, refrigerator panels, stove tops, stove, oven, and microwave panels, exhaust hoods, grills, and metal wheels or rims. Industrial items having metal surfaces include machined parts, bearings, fasteners or any metallic items that are prone to corrosion. Aerospace components having metal surfaces include instrumentation, airframe and propulsion components that may be prone to corrosion.

Metal substrates and metalized substrates are found in a variety of environments, including kitchens, bathrooms, laboratories, factories, garages, as well as many outdoor areas, where they can come in contact with aqueous residues and simply moisture from the air that can cause corrosion.

Without wanting to be bound by theory, it is believed that substrates comprising nucleophilic metal groups and oxidation products can bond to the phosphorous-containg acid group of the chemical compositions described herein.

In methods described herein, an article or surface is contacted with a composition as described herein. In some embodiments, the composition is present in a formulation comprising at least one of solvent or water. In some embodiments, the solvent comprises at least one of a hydrofluoroether or a lower alcohol (e.g., methanol, ethanol, propanol, isopropanol, isobutanol, butanol, sec-butanol).

In some embodiments, the solvent is a hydrofluoroether. Suitable hydrofluoroethers can be represented by the following general formula:

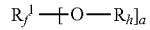

where a is an integer of 1 to 3, R$_f^1$ is a monovalent, divalent, or trivalent perfluoroalkyl, that is linear, branched, cyclic, or combinations thereof and that is optionally interrupted by at least one ether linkage (i.e., —O—); and R$_h$ an alkyl group that is linear, branched, cyclic, or combinations thereof and optionally contains at least one heteroatom (e.g., N, O, or S). For example, the hydrofluoroether can be methyl perfluorobutyl ether or ethyl perfluorobutyl ether.

In some embodiments, the formulation comprises water. In these embodiments, the formulation may also include solvent. In some embodiments wherein the formulation comprises water, it further comprises at least one of a nonionic or anionic surfactant. Suitable surfactants include those described in U.S. Pat. No. 6,995,222 (Buckanin et al.), the disclosure of which, relating to its description of surfactants, is incorporated herein by reference.

The formulations include from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 6, 7, 8, 9, or 10 percent by weight of at least one composition according to the present invention, based on the total weight of the formulation.

The methods of treating a surface typically entail volatilizing the solvent after application the coating composition to an article or surface, by allowing the coating composition to dry for about 1 to 24 (in some embodiments, 4 to 24 or even 8 to 24) hours. In some embodiments, the drying takes place at ambient temperature (e.g., 15 to 35° C.). In some embodiments, the composition is dried at elevated temperature (e.g., 50° C. to 150° C., or even 50° C. to 100° C.). Without wanting to be bound by theory, it is believed that during the drying time and over a subsequent period of time, compositions described herein can form chemical bonds with the substrate and/or between molecules of the chemical composition. In particular, the acid groups of the phosphorus-containing acid group are believed to form chemical bonds with (e.g. copper) metallic surfaces.

The compositions described herein may be applied by any suitable application method. Examples of useful application methods include spraying (e.g., with a spray bottle), padding, dipping (i.e., immersing the substrate in a formulation), spin-coating, flow coating, vacuum coating, painting, and wiping (e.g., with a sponge or cloth). When treating flat substrates of appropriate size, knife-coating or bar-coating may be used to ensure uniform coatings on a substrate.

The coating compositions can be applied to a substrate at various thicknesses. Coatings as thin as 20 (in some embodiments, 30, 40, or 50) nanometers up to 5 (in some embodiments, 4, 3, 2, or 1) micrometers can offer excellent low surface energy, stain-resistance, and/or stain-release. Thicker coatings (e.g., in the range of 1 to 5 micrometers) can be obtained by applying to the substrate a single thicker layer of a coating composition that contains a relatively high concentration of the chemical composition described herein. Thicker coatings can also be obtained by applying successive layers to the substrate of a coating composition that contains a relatively low concentration of the chemical composition described herein. The latter can be done by applying a layer of the coating composition to the substrate and then drying prior to application of a successive layer. Successive layers of the coating can then be applied to dried layers. This procedure can be repeated until the desired coating thickness is achieved.

Embodiments and advantages are further illustrated by the following non-limiting examples, but the particular materials and amounts thereof recited in these examples, as well as other conditions and details should not be construed to unduly limit this invention.

EXAMPLES

Unless otherwise noted, all parts, percentages, ratios, etc. in the examples and the rest of the specification are by weight. Unless otherwise noted all chemicals were obtained from, or are available from chemical suppliers such as Aldrich Chemical Company, Milwaukee, Wis.

Comparative Example A

Synthesis of Polymer 1

In a 2 necked oven dried 250 mL flask equipped with a magnetic bar, condenser was immersed in an oil bath and charged with HFPO—CONHCH$_2$CH$_2$—O—CO—C(CH$_3$)=CH$_2$ (20 g, prepared as described in US Patent Publications number US20050137355A1 (Buckanin et al.)), HEMA-P (2 g, obtained from Esstech, Inc., Essington Pa.), SH—(CH$_2$)$_3$—CH$_3$ (1 g); 2,2',-azobis(2-methylbutyronitrile), a thermal free-radical initiator (100 mg, obtained from E. I. du Pont de Nemours & Co., Wilmington Del. under the trade designation "VAZO®-67"); hydrofluoroether solvent (40 g, commercially available from 3M Company, St. Paul, Minn. under trade designation "Novec™ 7200 Engineered Fluid"). The solution was degassed for 10 minutes using N$_2$ and then capped and stirred at 70° C. for 16 hours. The reaction mixture was cooled and filtered using a filter paper (available from Whatman, Inc., Piscataway, N.J. under trade designation WHATMAN GRADE 40) and diluted to desired concentration (10 wt %) in "Novec™ 7200 Engineered Fluid" for coating.

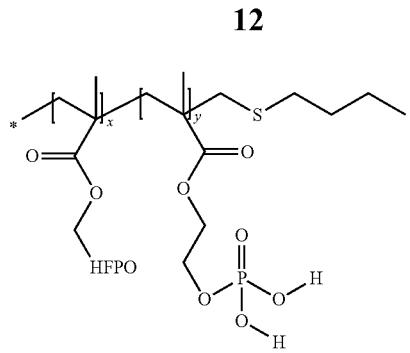

Synthesis of Polymer 2

An oven-dried 250 mL Erlenmeyer flask containing N$_2$ inlet, and condensers was immersed in an oil bath and was charged with HFPO—CONHCH$_2$CH$_2$—O—CO—C(CH$_3$)=CH$_2$ (20 g), HEMA-P (2 g), SH—(CH$_2$)$_3$—Si(OCH$_3$)$_3$ (1 g), VAZO-67 (100 mg), and "Novec™ 7200 Engineered Fluid" (40 g). The solution was degassed for 10 minutes using N$_2$ and then capped and stirred at 70° C. (oil bath temperature) for 16 hours. The reaction mixture was cooled and filtered using a filter paper (WHATMAN GRADE 40) and diluted to desired concentration (10 wt %) in "Novec™ 7200 Engineered Fluid" for coating.

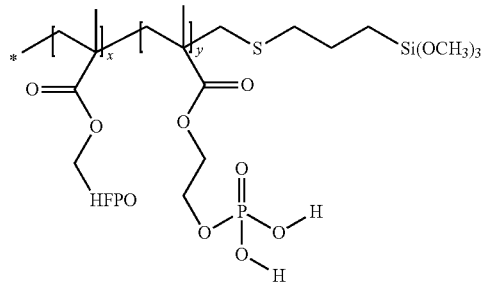

The molar percentage of the first, second and third units was 48/36/16.

Synthesis of Polymer 3

An oven-dried 250 mL Erlenmeyer flask containing N$_2$ inlet, and condensers was immersed in an oil bath and was charged with HFPO—CONHCH$_2$CH$_2$—O—CO—C(CH$_3$)=CH$_2$ (20 g), HEMA-P (2 g), A-174 (2 g, obtained from Momentive Performance Materials, Wilton, Conn., under trade designation SILQUEST A-174 SILANE) SH—(CH$_2$)$_3$—Si(OCH$_3$)$_3$ (1 g), VAZO-67 (100 mg), and "Novec™ 7200 Engineered Fluid" (40 g). The solution was degassed for 10 minutes using N$_2$ and then capped and stirred at 70° C. (oil bath temperature) for 16 hours. The reaction mixture was cooled and filtered using a filter paper (WHATMAN GRADE 40) and diluted to desired concentration (10 wt-%) in "Novec™ 7200 Engineered Fluid" for coating.

The molar percentage of the first, second and third units was 48/36/34.

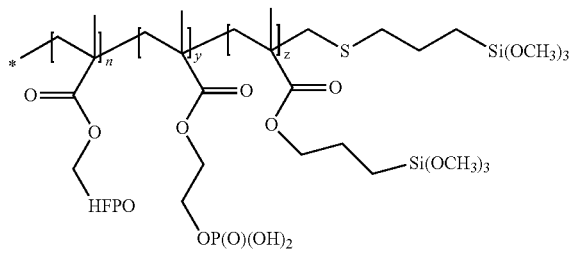

Comparative Example B

HFPO

Phosphonic acid, depicted as follows, was prepared as described in US 2005/0048288 A1.

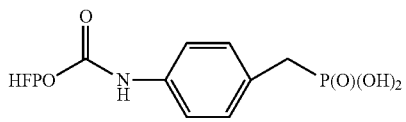

The compound was diluted to desired concentration (0.3 wt-%) in "Novec™ 7200 Engineered Fluid" for coating.

Surface Preparation

Copper plates were rinsed with water and then soaked onto a 50% $HNO_3$ for 2 minutes to remove the oxides on the surface. Cleaned with distilled water and dried again with acetone quickly and dried in $N_2$ stream. These plates were rapidly soaked into coating solutions for 1 minute. Coated copper plates were cured in an oven at 150° C. for 30 minutes.

Corrosion Test Results:

Copper plates coated as described above were tested for their corrosion resistance by soaking the coated plates in water (for 48 hours at room temperature or 90° C. for 3 hours) in aqueous 3.5 wt % NaCl solution for 48 hours as described below in table.

Corrosion test results for coated samples were interpreted as described in a manner similar to ASTM test method—D849-09. The test strips and standard were held in such a manner that light reflected from them at an angle of approximately 45°.

Ranking—0=No Change in appearance, 1=Slight tarnish, 2—Moderate Tarnish, 3—Dark Tarnish, 4—Corrosion Results are presented in table below:

| Example | Polymer | Ranking after water soak at room temperature - 48 hrs | Ranking after water soak at 90° C. for 3 hrs | Ranking after 3.5 wt % NaCl soak at room temperature - 48 hrs |
|---|---|---|---|---|
| Comparative Example A | Polymer 1 | 1 | 2 | 2 |
| 1 | Polymer 2 | 0 | 0 | 1 |
| 2 | Polymer 3 | 0 | 0 | 0 |
| Comparative Example B | HFPO-Phosphonic acid monolayer | 0 | 1 | 2 |

Examples 1 and 2 demonstrate the improvement in corrosion protection of Polymers 2 and 3 relative to Comparative Example A and B.

Static Contact Angle of Copper Plates Coated with a Monolayer of Polymer 3

Contact angles were measured using a VCA-2500XE video contact angle apparatus. Results are shown in the table. Reported values are averages of measurements on the left and right sides of at least three drops. Drop volumes were 5 microliters for static measurements.

| No | Polymer 3 (Wt-%) | Water | Hexadecane |
|---|---|---|---|
| 1 | 10 | 90 | 58 |
| 2 | 1 | 95 | 61 |
| 3 | 0.1 | 98 | 70 |

The results show that thinner (e.g. monolayer) coatings of Polymer 3 are suitable for providing a surface coating having a lower surface energy.

What is claimed is:

1. A polymeric composition comprising
   at least one first divalent unit comprising a pendant perfluoropolyether or perfluoroalkyl group;
   at least one second divalent unit comprising a pendant phosphorus-containing acid group selected from

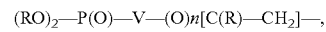

a combination thereof;
   wherein R is independently selected from the group consisting of hydrogen and alkyl having from 1 to 4 carbon atoms;
   V is independently alkylene that is optionally interrupted by at least one ether linkage or amine linkage;
   n is 0 or 1; and
   at least one third unit comprising a terminal or pendant alkoxy silane group.

2. The composition of claim 1 wherein the first and second units are derived from monomers further comprising a free-radically polymerizable group.

3. The composition of claim 1 wherein the first and second units are derived from monomers further comprising a (meth)acrylate group.

4. The composition of claim 1 wherein the composition comprises an acrylic backbone.

5. The composition of claim 1 wherein the first unit is a divalent unit selected from

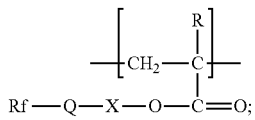

wherein
Rf is independently a perfluoropolyether group;
Q is independently selected from the group consisting of a bond, —C(O)—N(R$^1$)—, and —C(O)—O—;
R is independently hydrogen or alkyl having from 1 to 4 carbon atoms; and
X is independently selected from the group consisting of alkylene, arylalkylene, and alkylarylene, wherein alkylene, arylalkylene, and alkylarylene are each optionally interrupted by at least one heteroatom;
or

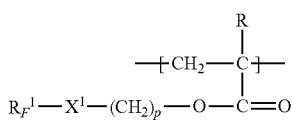

wherein
$R_F^1$ is a perfluoroalkyl group having 3 to 12 carbon atoms;
p is an integer from 2 to 11;
$X^1$ is a bond or $R_F^1SO_2N(R)$; and
R is independently hydrogen or an alkyl group having 1 to 4 carbon atoms.

6. The composition of claim 5 wherein Q is independently is selected from the group —C(O)—N(R)— and —C(O)—O—.

7. The composition of claim 1 wherein the third unit has the formula:

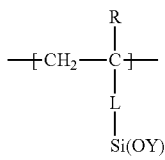

wherein
R is independently selected from the group consisting of hydrogen and alkyl having from 1 to 4 carbon atoms
L is $CO_2(CH_2)_n$ with n=2 to 6 or phenyl; and
Y is independently an alkyl group having 1 to 4 carbon atoms.

8. The composition of claim 1 wherein the third unit has the formula

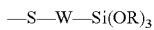

wherein R is independently selected from the group consisting of hydrogen and alkyl having from 1 to 4 carbon atoms and W is an alkylene group having 1 to 4 carbon atoms.

9. The composition of claim 1 wherein the first unit ranges from 20 to 80 mole %.

10. The composition of claim 1 wherein the second unit ranges from 15 to 50 mole %.

11. The composition of claim 1 wherein the third unit ranges from 5 to 50 mole %.

12. A coating composition comprising the composition of claim 1 dissolved or dispersed in a solvent.

13. The coating composition of claim 12 wherein the solvent is a non-aqueous organic solvent.

14. The coating composition of claim 13 wherein the solvent comprises a hydrofluoroether.

15. A method of providing a coated article or surface comprising:
applying the coating composition of claim 1 to an article or surface; and
volatilizing the solvent.

16. The method of claim 15 wherein the coating is applied to a metallic surface and the coating provides corrosion protection.

17. A corrosion protected article comprising:
an article comprising a metallic surface; and
the composition of claim 1 disposed on the metal-containing surface.

18. A polymeric composition comprising
at least one first divalent unit comprising a pendant perfluoropolyether or perfluoroalkyl group;
at least one second divalent unit comprising a pendant phosphorus-containing acid group; and
at least one third unit having the formula

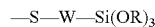

wherein R is independently hydrogen or alkyl having from 1 to 4 carbon atoms and W is an alkylene group having 1 to 4 carbon atoms.

19. The composition of claim 18 wherein the first and second units are derived from monomers further comprising a free-radically polymerizable group.

20. The composition of claim 18 wherein the first and second units are derived from monomers further comprising a (meth)acrylate group.

21. The composition of claim 18 wherein the composition comprises an acrylic backbone.

22. The composition of claim 18 wherein the first unit is a divalent unit selected from

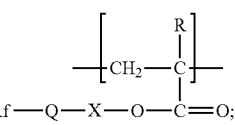

wherein
Rf is independently a perfluoropolyether group;
Q is independently selected from the group consisting of a bond, —C(O)—N(R$^1$)—, and —C(O)—O—;
R is independently hydrogen or alkyl having from 1 to 4 carbon atoms; and
X is independently selected from the group consisting of alkylene, arylalkylene, and alkylarylene, wherein alkylene, arylalkylene, and alkylarylene are each optionally interrupted by at least one heteroatom;

or

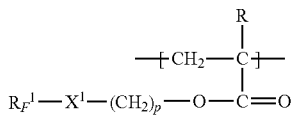

wherein $R_F^1$ is a perfluoroalkyl group having 3 to 12 carbon atoms;

p is an integer from 2 to 11;

$X^1$ is a bond or $R_F^1SO_2N(R)$; and

R is independently hydrogen or an alkyl group having 1 to 4 carbon atoms.

23. The composition of claim 22 wherein Q is independently is selected from the group —C(O)—N(R)— and —C(O)—O—.

24. The composition of claim 18 wherein the second unit is selected from

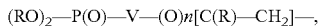

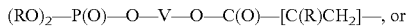

a combination thereof;

wherein R is independently selected from the group consisting of hydrogen and alkyl having from 1 to 4 carbon atoms;

V is independently alkylene that is optionally interrupted by at least one ether linkage or amine linkage; and n is 0 or 1.

25. The composition of claim 18 further comprising a third unit having the formula:

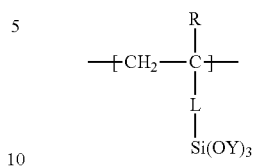

wherein

R is independently selected from the group consisting of hydrogen and alkyl having from 1 to 4 carbon atoms L is $CO_2(CH_2)_n$ with n=2 to 6 or phenyl; and Y is independently an alkyl group having 1 to 4 carbon atoms.

26. The composition of claim 18 wherein the first unit ranges from 20 to 80 mole %.

27. The composition of claim 18 wherein the second unit ranges from 15 to 50 mole %.

28. The composition of claim 18 wherein the third unit ranges from 5 to 50 mole %.

29. A coating composition comprising the composition of claim 18 dissolved or dispersed in a solvent.

30. The coating composition of claim 29 wherein the solvent is a non-aqueous organic solvent.

31. The coating composition of claim 30 wherein the solvent comprises a hydrofluoroether.

32. A method of providing a coated article or surface comprising:

applying the coating composition of claim 18 to an article or surface; and volatilizing the solvent.

33. The method of claim 22 wherein the coating is applied to a metallic surface and the coating provides corrosion protection.

34. A corrosion protected article comprising:

an article comprising a metallic surface; and the composition of claim 18 disposed on the metal-containing surface.

* * * * *